US006646793B2

(12) United States Patent
Bruesselbach et al.

(10) Patent No.: US 6,646,793 B2
(45) Date of Patent: Nov. 11, 2003

(54) HIGH GAIN LASER AMPLIFIER

(75) Inventors: Hans W. Bruesselbach, Calabasas; Alexander A. Betin, Manhattan Beach; David S. Sumida, Los Angeles, all of CA (US)

(73) Assignees: Raytheon Company, Lexington, MA (US); Hughes Electronics Corporation, El Segundo, CA (US)

( * ) Notice: Subject to any disclaimer, the term of this patent is extended or adjusted under 35 U.S.C. 154(b) by 244 days.

(21) Appl. No.: 09/736,997

(22) Filed: Dec. 14, 2000

(65) Prior Publication Data

US 2002/0101893 A1 Aug. 1, 2002

(51) Int. Cl.$^7$ ................................................. H01S 3/00
(52) U.S. Cl. ........................................ 359/342; 372/41
(58) Field of Search .............................. 359/342; 372/41

(56) References Cited

U.S. PATENT DOCUMENTS

| | | | | |
|---|---|---|---|---|
| 3,219,585 A | * | 11/1965 | Kaiser | 372/41 |
| 5,717,517 A | * | 2/1998 | Alfano et al. | 359/342 |
| 5,761,233 A | | 6/1998 | Bruesselbach et al. | |
| 5,936,984 A | | 8/1999 | Meissner et al. | |
| 5,974,061 A | | 10/1999 | Byren et al. | |
| 6,115,400 A | | 9/2000 | Brown | |
| 6,160,824 A | | 12/2000 | Meissner et al. | |

OTHER PUBLICATIONS

Griebner, U. et al.: "Laser With Guided Pump and Free–Propagating Resonator Mode Using Diffusion–Bonded Rectangular Channel Waveguides", Applied Physics Letters,. American Institute of Physics, New York, US, vol. 77, No. 22, Nov. 27, 2000, pp. 3505–3507, XP000994237, ISSN: 0003–6951, p. 3505.

* cited by examiner

Primary Examiner—Mark Hellner
(74) Attorney, Agent, or Firm—Colin M. Raufer; Leonard A. Alkov; Glenn H. Lenzen, Jr.

(57) ABSTRACT

A high gain optical amplifier and method. Generally, the inventive amplifier includes a first crystal having an axis and a first index of refraction and a second crystal bonded to the first crystal about the axis and having a second index of refraction. The first index is higher than the second index such that light through the first crystal is totally internally reflected. In the illustrative embodiment, the first crystal is Yb:YAG with an index of approximately 1.82, the second crystal is Sapphire with an index of approximately 1.78, and the axis is the propagation axis. The invention is, in its preferred embodiment, a light guide fabricated out of crystalline materials, diffusion bonded together. If the core of the light guide is doped with laser ions, high gain amplifiers made be designed and operable over a large étendue. With a judicious choice of the laser crystal and cladding materials, shape, and bonding technique, the guided amplifier is much less susceptible to parasitic oscillation than amplifiers constructed in accordance with conventional teachings. The clad core is also able to handle larger thermal load without breakage than can an unclad core.

6 Claims, 1 Drawing Sheet

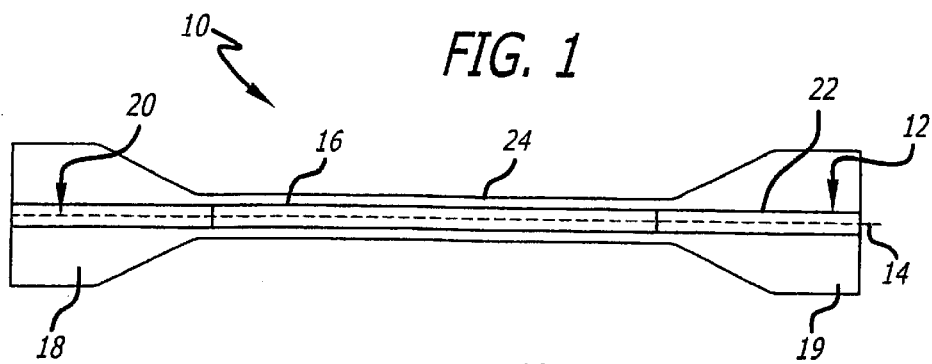
FIG. 1
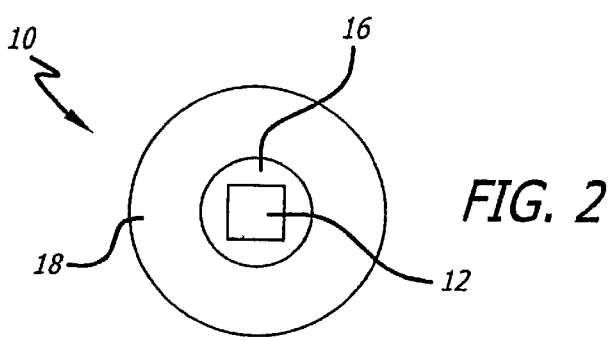
FIG. 2
FIG. 3
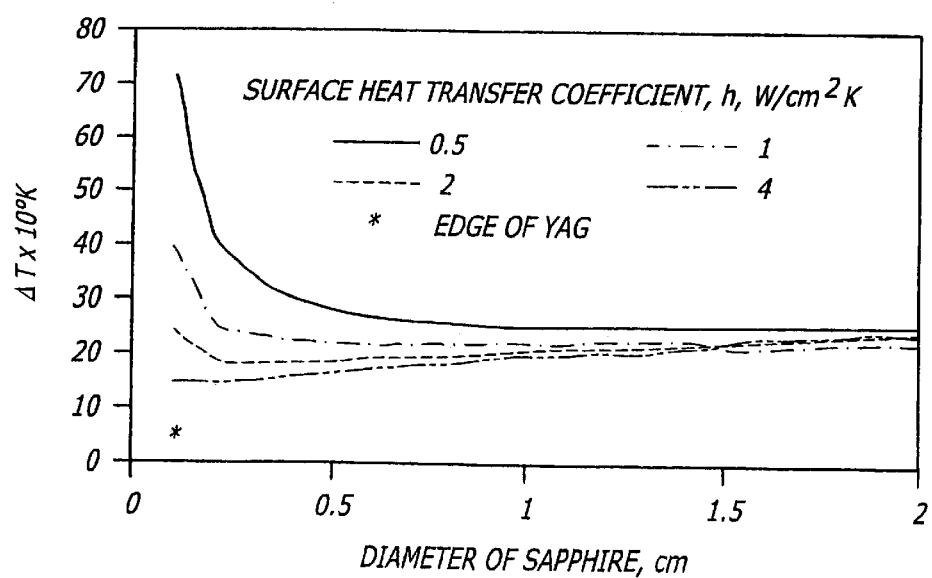
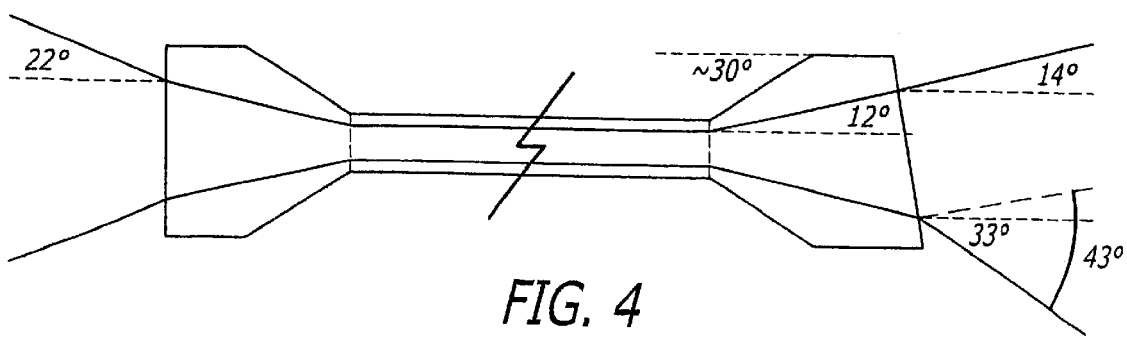
FIG. 4

HIGH GAIN LASER AMPLIFIER

This invention was made with Government support under Agreement No. MDA 972-94-3-0020 awarded by ARPA. The Government has certain rights in the invention.

BACKGROUND OF THE INVENTION

1. Field of the Invention

The present invention relates to optical and other electromagnetic systems. More specifically, the present invention relates to high gain and high etendue optical amplifiers for use with lasers and other devices.

2. Description of the Related Art

Optical amplifiers are used in many applications. Optical amplifiers are used as gain elements in lasers and in a number of other optical systems such as amplifiers per se in Master Oscillator Power Amplifiers (MOPAs), the amplifying component of loop phase conjugator systems, and as the nonlinear medium in optical four-wave mixing devices. In these and other applications, high gain at large etendue is often the enabling and most important design consideration. Étendue is defined as the product of the cross-sectional area of a beam and its full angular extent.

The prior art for optical amplifiers can be divided into two categories: guided and unguided. With unguided amplifiers, étendue is maximized by adjusting the transverse-to-longitudinal dimension ratio, since the angular field of view of such an amplifier is, to within factors of order unity that depend on the details of the geometry, proportional to the transverse dimension divided by the length. Unfortunately, high gain and high etendue in these conventional, non-guided, optical amplifiers are inherently conflicting requirements. This is due to the fact that although the gain coefficient is directly proportional to the amplifier's length, the étendue is inversely proportional. Although the gain of these conventional optical amplifiers is in textbook theories limited by amplified spontaneous emission, in practice it is typically limited by the onset of parasitic oscillations involving reflections from the boundaries of the gain medium or other nearby surfaces.

These limits are addressed by guided amplifiers, which make higher gains and étendue available. In this context, it is important to point out that unguided amplifiers have historically had the advantage that optical images can be propagated through them, whereas guided amplifiers scramble the optical information. In optical systems where phase conjugation is used, however, this issue is effectively circumvented, and the advantages of the guided amplifiers come to the foreground.

Guided amplifiers use total internal reflection (TIR) from the interface of their optically finished boundaries to the surrounding air, water, bonding, or other material. Both rods and slabs have been used for this purpose. Fiber amplifiers also fall into the category of being guided amplifiers, but high-étendue devices have not been fabricated. In any event, the performance of guided devices can also be limited by parasitic oscillation. Recent art, for example, uses a polished cylindrical rod as a light guide in an end-pumped optical amplifier (in this art the guiding was desired only for the pump, not the gain wavelength). The gain achievable from this device was reported to be limited, however, by parasitic oscillation around its circumference.

Hence, there is a need in the art, for applications such as optical phase conjugation and others, for a system or method for providing optical amplification with high étendue and high gain while suppressing parasitic oscillation.

SUMMARY OF THE INVENTION

The need in the art is addressed by the optical amplifier and method of the present invention. Generally, the inventive amplifier includes a first crystal with a first index of refraction and a second crystal bonded to the first crystal about an axis of propagation and having a second index of refraction. The first index is slightly higher than the second index such that light through the first crystal is totally internally reflected.

In the illustrative embodiment, the first crystal is a square-cross-sectioned parallelepiped of Yb:YAG, having an index of refraction of approximately 1.82, and the second crystal is several pieces of sapphire with an index of approximately 1.78, surrounding the Yb:YAG. Light is guided along the long dimension of the parallelepiped. The invention is, in its preferred embodiment, a light guide fabricated out of crystalline materials, diffusion bonded together. If the core of the light guide is doped with laser ions, high gain amplifiers made be designed and operable over a large étendue. With a judicious choice of the laser crystal and cladding materials, shape, and bonding technique, the guided amplifier is much less susceptible to parasitic oscillation than amplifiers constructed in accordance with the teachings of the present art.

The diffusion bonded structure guides both the lasing wavelength and the optical pumping beam, which may be supplied by a laser diode array. Alternatively, if the pumping beams have insufficient brightness to be launchable into the core, they may be guided by the cladding. In either case, this low loss guiding down a path several absorption depths long is conducive to efficient pumping, making possible high gain with quasi-three or four level ions, not achievable with the present art.

The purpose in configuring the gain medium as a light guide is to take advantage of the fact that the étendue then depends only on the guide's transverse size and numerical aperture, and not on its length. Therefore, the gain and étendue can both be increased.

As mentioned above, the gain of practical optical amplifiers is limited by the onset of parasitic oscillation. Large étendue makes guided amplifiers particularly susceptible to parasitic oscillation. The present invention can better achieve high gain in a guided amplifier because, in the best implementations, it uses a polygonal (preferably square or rectangular) rather than a circular guide cross section. Also, the cladding refractive index is selected to limit the guide-to-cladding total internal reflection (TIR) angle to disallow parasitic modes.

Further, in a particular embodiment broad band antireflection (AR) coatings and/or end caps are used to inhibit guide-end-reflection-involved modes. Although the illustrative embodiment is a diffusion-bonded composite crystal, a functional embodiment of the invention could be made of glass. Indeed a functional embodiment could be fabricated of any transparent solids bonded together in any way (such as index-specific optical cements) that maintains the desired guiding properties and which will not overheat or damage at the optical power levels involved.

A further advantage is that the cladding leads to more effective cooling of the doped core than would be possible if a gain element of the core's size were directly cooled by impingement or conventional forced-convection cooling. In this type of cooling, the $\Delta T$ between the surface being cooled and the coolant is directly proportional to the heat per area and inversely proportional to a heat transfer coefficient. The total temperature drop between the core and the coolant is smaller for the clad device. This is because although additional $\Delta T$ is necessarily introduced via the finite thermal conductivity of the cladding, the cladding simply having larger surface area more than compensates for the difficulties involved in obtaining a correspondingly larger heat transfer coefficient at the solid-liquid interface.

Another advantage of the present invention is that it makes end pumping of low absorption cross-section materials, such as Yb:YAG possible. It allows use of a long piece of material, in either a core-pumped or a cladding-pumped geometry. Parasitic oscillation is prevented by selection of the relative indices of the core and cladding to disallow parasitic oscillation for the particular core cross sectional shape selected. Previous end-pumping schemes have failed because of the parasitic oscillation issue.

BRIEF DESCRIPTION OF THE DRAWINGS

FIG. 1 is a sectional side view of an optical amplifier constructed in accordance with the teachings of the present invention.

FIG. 2 is an end view of the optical amplifier of FIG. 1.

FIG. 3 is a plot of the calculated temperature differential from the center of the rod to the flowing water for a circular cylindrical YAG rod clad with Sapphire, being cooled with forced convection of water.

FIG. 4 is a diagram showing two possible clad rod end configurations of an optical amplifier constructed in accordance with the teachings of the present invention, showing paths of rays at extremes of numerical aperture.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would-be of significant utility.

FIG. 1 is a sectional side view of an optical amplifier constructed in accordance with the teachings of the present invention. FIG. 2 is an end view of the optical amplifier of FIG. 1. The amplifier 10, includes a first crystal 12, having a geometric and propagation axis 14 associated with it, and having a first index of refraction $n_1$. A second crystal 16 is bonded to the first crystal 12 about the axis 14 and it has a second index of refraction $n_2$. The diffusion bonded interfaces between the first and second crystals 12 and 16 should be free of gaps, voids, and inclusions.

In accordance with the present teachings, the first index $n_1$ is slightly higher than the second index $n_2$ such that light through the first crystal is totally internally reflected. In the illustrative embodiment, the amplifier 10 is a Sapphire-clad ytterbium-doped yttrium aluminum garnet (Yb:YAG) guided amplifier, primarily for use in a loop conjugator. That is, in the illustrative embodiment, the first crystal is primarily doped Yb:YAG and the second crystal 16 is Sapphire. As is known in the art, Yb:YAG has an index of refraction $n_1=1.82$ and Sapphire is a birefringent material having an average index of refraction $n_2=1.78$.

The amplifier 10 has first and second ends 18 and 19. The ends 18 and 19 have a substantially greater diameter than the cladding 16. In the illustrative embodiment, the ends 18 and 19 are made of Sapphire. In the illustrative embodiment, the proximal and distal ends 20 and 22 of the first crystal 12, extending through the first and second ends 18 and 19, respectively, are fabricated with clear undoped YAG. The small diameter midsection portion 24 of the amplifier is commercial grade-polished. All surfaces, other than the ends, are rough ground.

As illustrated in the end view of FIG. 2, the first crystal 12 is concentric within the second crystal 16, within 0.2 mm in the best implementations of the invention.

The Sapphire-clad rod has no doped YAG surface where breakage can start, since the YAG is completely enclosed in the much stronger Sapphire. As the power and the temperature go up, the YAG rod 12 is increasingly compressed. The Sapphire surface 16 is under tension, but the Sapphire cladding's thickness should be chosen to adequately resist the YAG rod's expansion while also maximizing conductive heat removal. Because (1) the surface tensile stress on a larger diameter cladding (note that little or no heat should be generated in the cladding) is smaller than the stress on an unclad rod at the same internal heating, (2) Sapphire is stronger than YAG, and (3) the cladding can be thick, the clad rod can operate at much higher power without breaking than can an unclad rod.

As is known in the art, the governing high power laser crystal cooling issue is the large surface heat flux (heat per area), upwards of 100 Watts/cm² in practice. The temperature differential ($\Delta T$) across a crystal-to-liquid-coolant interface is proportional to this heat flux and inversely proportional to the heat transfer coefficient. The transfer coefficient can be maximized with well-designed impingement cooling. The inventive clad rod provides a further means to reduce this $\Delta T$ by reducing the heat flux at the surface of the crystal, simply because even though the total heat coming out of the crystal is the same, the area of the outside of the cladding is larger than that of the unclad rod. The reduction in the water/material interface $\Delta T$ is traded against the conductive $\Delta T$ in the Sapphire cladding, which can be small because Sapphire has high thermal conductivity.

To quantify this, note that $\Delta T$ from the Yb:YAG's center to inside the water beyond the boundary layer can be written:

$$\Delta T = \frac{G}{2\pi L}\left(\frac{1}{Rh} + \frac{\ln(R/r)}{K_{Sapphire}} + \frac{1}{K_{YAG}}\right) \qquad [1]$$

where G is the total heat originating in the YAG part of the length, L, of composite rod being considered, R is the outer radius of the Sapphire cladding, assumed to be a circular cylinder, r is the radius of the YAG, also assumed to be a circular cylinder, h is the surface heat transfer coefficient, $K_{sapphire}$ is the thermal conductivity of Sapphire (0.33 W/cmK), and $K_{YAG}$ is the thermal conductivity of Yb:YAG (0.1 W/cmK). Circular cylinders are assumed so closed-form mathematical expressions can be written; although round cores can not currently be diffusion bonded in practice, the essential results of the thermal calculation are similar for the realizable shapes, which are best modeled by numerical methods.

The first term comes from the heat transfer in the water boundary layer. The second term describes conduction through the Sapphire (in which we assume no heat is generated); it has the logarithmic dependence typical of cylindrical geometry. The third term describes the heat generation and thermal conduction in the Yb:YAG; this $\Delta T$ is independent of the diameter of the rod and depends only on the heat generated per length.

This equation is plotted in FIG. 3. FIG. 3 is a plot of the calculated temperature differential from the center of the rod to the water for a circular cylindrical YAG rod clad with Sapphire. The total $\Delta T$ is plotted as a function of the outside diameter of the Sapphire, assuming a fixed YAG diameter of 2 mm and a modest fixed heat load of 10 W/cm, with the heat transfer coefficient as a parameter. Note that it is advantageous to have cladding when the heat transfer coefficient is small.

Cooling uniformity can also be superior for a clad rod. For a clad rod the uniformity depends on the quality of the diffusion bonding and on the geometry, whereas for direct liquid cooling the uniformity depends on the details of the coolant flow; good uniformity with impingement cooling is obtained by using a large number of small jets. Thus, for a clad rod, a less refined impingement design may be used. Mechanical vibration is also less of an issue.

It can be seen from FIG. 3 that the Sapphire sleeve improves the cooling except when the heat transfer coefficient h is very high, and even in this case the ΔT penalty for having the cladding is insignificant. When h is poor, the cladding can bring the ΔT to within a factor of two of the ΔT obtainable with order-of-magnitude larger heat transfer coefficients. High heat transfer coefficients require careful impingement design and large pressure drops and flow volumes. Even when h is high, the other benefits of cladding, such as homogenization of the spatial nonuniformities inherent to impingement cooling, added strength and thermal fracture resistance, and the corrosion resistance of the Sapphire surface, more than make up for this. Note also that if cladding pumping (which requires an optical polish on the outside of the Sapphire) is not used, the Sapphire surface properties can be optimized for maximum heat transfer, rather than for its optical properties. Because Sapphire is so much stronger than YAG, and because the surface strain can be reduced by making the crystal larger, it is not necessary to optimize the surface for fracture strength.

In deciding on the relative dimensions of the cladding and the core, several issues should be considered:

Cooling issues drive the dimensions of the cladding via the tradeoffs summarized in FIG. 3. There is a range of core and cladding dimensions that optimize cooling.

There is a size that is best for parasitic suppression.

The cladding needs to be polished if cladding pumping is used, and lasing theory, including knowledge of the available diode étendue, indicates that there is an optimal ratio for cladding area versus core area for a given doping.

Due to the nature of diffusion bonding technology, the core is necessarily rectangular, or, with a larger number of fabrication steps, polygonal. In the illustrative embodiment, a square core is employed as illustrated in FIG. 2, with dimensions determined mainly by the tradeoff between good extraction efficiency, which argues for a small core, and the desire to end pump directly into the core, which argues for large core. This tradeoff may be summarized as follows.

The saturation intensity for the Yb:YAG lasing transition utilized in the illustrative embodiment is 9.1 kW/cm$^2$, or 91 W/mm$^2$. To operate the device at output power on the order of 100–200 watts, a one-millimeter square or smaller crystal may be appropriate. On the other hand, the saturation intensity for the Yb:YAG pumping transition of the illustrative embodiment is 24 kW/cm$^2$, or 240 W/mm$^2$, and the diodes must be capable of delivering on this order of intensity to pump into the core. In the illustrative embodiment, the width of the core is 1 mm. Those skilled in the art will appreciate that the size of the core will depend on several factors. For the illustrative embodiment, the core size was determined by taking into account the fact that a balanced-étendue diode stack (half of a thirty-one bar stack at 300 W), can be focused into a ~1.1 mm diameter focal spot having an intensity of ~225 W/mm$^2$ using optics matching the numerical aperture of the guiding core (The YAG-sapphire interface gives NA=0.37, F/1.3).

FIG. 4 is a diagram showing two possible clad rod end configurations, showing paths of rays at extremes of numerical aperture. One has tilted a tilted end face and the other end face is perpendicular to the guide axis. Note that the length of the doped Yb:YAG core shown is arbitrary and the exact geometry of the end caps is diagrammatic. Both of these end-cap embodiments differ from that of FIGS. 1 and 2 in that the ends are entirely Sapphire, whereas in the FIGS. 1 and 2 embodiment the core extended all the way to the end (which was tilted). The designs of FIG. 4 are preferred for a guided amplifier inasmuch as it these designs have the end caps entirely made out of Sapphire, rather than having an undoped YAG core all the way to the ends. However, the embodiments of FIG. 4 cannot be assembled without at least one Sapphire "c"-face, or close (~10° away) to "c"-face, diffusion bond. Unfortunately, diffusion bonds of this kind are currently difficult to manufacture.

FIG. 4 illustrates another issue relevant to guided amplifier design. The geometry of a 10° tilted end faces is shown at the right. Rays are indicated at the extremes of the numerical aperture of the guided core. A problem that arises when tilted ends are used with a guided rod can be understood from examination of this figure. It will be seen that a significant fraction of the rays pass through the end surfaces at very large angles of incidence, approaching 43°. It is challenging to produce an antireflection coating that functions well at both the pump and signal wavelength over the full range of angles from zero to 43°. In the normal incidence situation, shown at the left of the figure, the coating needs specification only out to 22°, within the capability of standard coatings. For this reason, in the preferred embodiment, a minimal tilt of approximately ~1–3° is applied to the rod ends. This tilt should be sufficient to direct stray reflections out of the beamline. The small signal gain of the amplifier is 35, so that parasitic oscillation from the end faces should not occur so long as their reflection is less than about 3%.

The guided amplifier of the present invention is of course applicable to other laser ions, such as neodymium (Nd) or thulium (Tm), and other crystal hosts, such as YLF, YALO, and so on. The invention is particularly useful for mechanically weak or thermally poor hosts. The present teachings have enabled the construction of Yb:YAG amplifiers with CW gain greater than 10. This is because pump guiding makes possible high pumping efficiency even for low cross-section, quasi-four-level laser ions using the low doping levels necessary for acceptable thermal load per volume and length. Since the étendue is length-independent, both the gain per length and the heating per length can be small. The former aids transverse-parasitic-oscillation suppression, the latter aids thermal management. Also note that, in general, fewer-sided polygonal cores are associated with better parasitic oscillation suppression, triangular being best. The first embodiment's core is square for ease of fabrication and convenience of ancillary optics.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. An optical amplifier comprising:
   a first crystal having an axis and a first index of refraction and a second crystal bonded to the first crystal about the axis and having a second index of refraction, the first index being higher than the second index, whereby light through the first crystal is totally internally reflected.

2. The invention of claim 1 wherein the axis is a propagation axis for guided light.

3. The invention of claim 1 wherein the first crystal is Yb:YAG.

4. The invention of claim 3 wherein the first index is approximately 1.82.

5. The invention of claim 3 wherein the second crystal is sapphire.

6. The invention of claim 5 wherein the second index is approximately 1.78.

* * * * *